United States Patent Office 3,679,388
Patented July 25, 1972

3,679,388
TOUGHENING OF GLASS
David George Giddings, Stourbridge, and David Duncan Murphy, Leamington Spa, England, assignors to Pilkington Brothers Limited, Liverpool, England
No Drawing. Filed Dec. 30, 1969, Ser. No. 889,340
Claims priority, application Great Britain, Jan. 8, 1969, 1,262/69; June 24, 1969, 31,952/69
Int. Cl. C03b 27/00
U.S. Cl. 65—116                    12 Claims

ABSTRACT OF THE DISCLOSURE

Glass heated to a temperature near its softening point is toughened by heat exchange with an oil held at a temperature below the flash point of the oil, there being maintained in the oil a proportion from 0.01% to 0.07% by weight of a liquid having a boiling point lower than the flash point of the oil.

BACKGROUND OF THE INVENTION

This invention relates to the toughening of glass, for example, in the manufacture of glass panels to be embodied in supersonic aircraft.

The invention is based on the discovery that the efficacy of some oils as a chilling liquid in the toughening of glass of thickness within the preferred range, 4 mm. to 12 mm., is improved if there is present in the oil a small regulated proportion of a liquid having a boiling point lower than the flash point of the oil. For example, the low boiling point liquid may be an organic liquid such as carbon tetrachloride, methanol, benzene, toluene, trimethyl alcohol, ethyl alcohol, acetone or xylene.

SUMMARY

A method of toughening glass, in which the glass is heated to a temperature near to its softening point, comprises toughening the heated glass by heat exchange with an oil held at a temperature below the flash point of the oil in which there is maintained a proportion from 0.01% to 0.07% by weight of a liquid having a boiling point lower than the flash point of the oil.

Preferably the oil/low boiling point liquid mixture is held at a temperature lying between the boiling point of the low boiling point liquid and the flash point of the oil.

The oil may be an oil selected from oils having a viscosity in the range of 300 to 1000 centistokes at 38° C. and a flash point in the range 220° C. to 310° C.

The method of the invention has been devised particularly for the toughening of sheets of soda-lime-silica glass which are 6 mm. thick with the intention of use of that glass in the manufacture of glass panels for supersonic aircraft. The glass of this thickness, as of other thicknesses within the specified range, can be produced by the float process and in toughening float glass of this thickness, said proportion of low boiling point liquid is preferably in the range 0.015% to 0.05% by weight.

The invention also comprehends a toughened glass article of soda-lime-silica glass whose thickness is in the range 4 mm. to 12 mm., having a central tensile stress in the range 500 kg./cm.$^2$ to 1200 kg./cm.$^2$ and a ratio of surface compressive stress to central tensile stress in the range 2:1 to 4:1.

The article may have a thickness of 6 mm., and a central tensile stress in the range 630 kg./cm.$^2$ to 840 kg./cm.$^2$.

The invention further comprehends a laminated glass assembly including at least one sheet of toughened glass as described above.

DESCRIPTION OF THE PREFERRED EMBODIMENTS

Glass sheets for example, square glass panels of soda-lime-silica glass, which are 30 cm. square, were toughened by the method of the invention. The sheets of glass were first subjected to an edge finishing operation in order to produce a bright edge finish. This was effected using first a "linisher" belt coated with carborundum followed by a finishing operation with a cork "linisher" belt impregnated with ceri-rouge. It was found that with effective edge finishing of this nature the glass temperature might be maintained in the lower region of the specified range of 650° C. to 740° C. but it was preferred, as in a number of examples set out below, to heat the glass to a temperature of about 700° C. prior to quenching.

The glass sheets were then suspended in tongs in a vertical heating furnace and when the glass had reached the desired initial temperature, e.g. of about 700° C., the suspended hot glass sheets were lowered at the rate of about 30 cm. per second through a mouth in the bottom of the furnace and into a tank of a selected chilling oil disposed near said mouth, the oil having a high initial boiling point and containing a selected proportion of a liquid having a boiling point lower than the flash point of the oil.

This selected oil/low boiling point liquid mixture was maintained, in each example, at a temperature in the range 150° C. to 240° C. The lower the temperature of the mixture, that is near the 150° C. end of the specified range, the better was the retention of the low boiling point liquid in the mixture, but at temperatures for the mixture, such as about 200° C. or higher, which were employed in many of the examples, the selected proportion of low boiling point liquid was maintained in the mixture by adding further low boiling point liquid as the mixture was circulated through a heat exchanger which maintained the circulation in the tank of oil/low boiling point liquid mixture at the required temperature of the mixture.

Commercial oils were selected for the quenching and a range of oils having a viscosity in the range 300 to 1000 centistokes at 38° C. and a flash point in the range 220° C. to 310° C. were selected for use.

In a number of the examples, the selected oil/low boiling point liquid mixture contained as selected proportion of carbon tetrachloride ($CCl_4$) as the low boiling point liquid, the selected proportion being maintained within the range 0.01% to 0.07% by weight. However, in other examples, a selected proportion of toluene ($C_6H_5 \cdot CH_3$), benzene ($C_6H_6$), acetone (($CH_3)_2CO$), or xylene ($C_6H_4(CH_3)_2$) was present in the oil, instead of carbon tetrachloride. Methanol is also another suitable low boiling point liquid.

The percentage of the low boiling point liquid necessary depended on the nature of the oil, principally its viscosity, the thickness of the glass to be toughened, and the modulus of rupture, the central tensile stress and the ratio of surface compressive stress to central tensile, required in the glass. The glass undergoes a rapid chilling as it is quenched in the oil/low boiling point liquid mixture and thereafter cools gradually to the temperature of the oil/low boiling point liquid mixture, having attained the desired stress characteristics by the time it reaches that temperature. The glass was then removed from the oil/low boiling point liquid mixture and washed.

If desired, the toughened glass sheet may be laminated with one or more other glass sheets to form, for example, a glass panel to be embodied in supersonic aircraft.

The table quoted below gives a number of examples of the stresses obtained by quenching a glass sheet in a selected oil containing a specific proportion of a low boiling point liquid.

Different low boiling point liquids were employed, and the selected proportion of said liquid, the thickness of the glass, the initial temperature of the glass and the temperature of the selected oil/low boiling point liquid mixture were varied to both extremes of the particular ranges quoted above.

The selected oils comprised three different oils and the one used in each example is given in the table. The first oil was Cylrex 200M (Mobil Oil Company), a heavy naphthenic oil whose flash point is 305° C. and whose viscosity is 974 centistokes at 38° C. The next oil was Cylrex FM (Mobil Oil Company) which is a lighter oil having a flash point of 275° C. and a viscosity of 640 centistokes at 38° C. The third oil, Vacuoline AA (Mobil Oil Company) is a lighter oil still whose flash point is 225° C. and viscosity is in the range 310 to 342 centistokes at 38° C.

After each glass sheet was toughened, the modulus of rupture, the central tensile stress, and the ratio of surface compressive stress to central tensile stress, were determined in the following manner.

The toughened glass sheet under test was placed across a pair of knife edges and a steadily increasing load was applied through a similar pair of knife edges placed near the mid-point of the glass sheet. The modulus of rupture, which effectively corresponds to the breaking stress in the convex surface of the glass sheet when in tension, was then calculated from the load applied at the instant of fracture and the cross-section of the glass sheet.

The central tensile stress in the toughened glass sheet was measured by an instrument developed by Triplex Safety Glass Company Limited which is employed to pass a beam of polarised light at a grazing angle into a principal surface of the glass sheet in such a manner that the beam emerges through the median of the peripheral edge surface of the sheet. The beam leaving the peripheral edge is analysed by a Babinet compensator and the central tensile stress in the glass sheet is then obtained by observing the slope of the fringe formed in the beam and comparing this slope with a previous calibration.

Finally, the surface compressive stress of the glass sheet, for calculation of the ratio of the surface compressive stress to central tensile stress, is obtained by using the differential surface refractometer designed by the Pittsburgh Plate Glass Company. With this instrument, a beam of polarised light is refracted into a principal surface of the glass sheet at a critical angle which is predetermined by the relative refractive indices of the instrument components and the glass sheet, the beam traveling close to and parallel with the surface of the sheet. The compressive stress in the surface of the sheet is related to the difference in the refractive indices for light which is polarised perpendicular and parallel to the plane of incidence, and the light which emerges from the surface is analysed to give a measure of the surface compressive stress in the glass sheet.

TABLE OF EXAMPLES

| Ex. No. | Thickness of glass in mm. | Temperature of glass in °C. | Type of oil (Mobile Oil Company) | Proportion of low boiling point liquid in percent by weight | Temperature of oil/liquid mixture in °C. | Modulus of rupture in kg./cm.² | Central tensile stress in kg./cm.² | Ratio of surface compressive stress to central tensile stress |
|---|---|---|---|---|---|---|---|---|
| 1 | 4 | 650 | Vacuoline AA | 0.01 CCl₄ | 200 | 1,500 | 500 | 2:1 |
| 2 | 4 | 700 | Cylrex FM | 0.07 CCl₄ | 200 | 3,500 | 840 | 3.5:1 |
| 3 | 4 | 675 | Cylrax 200M | 0.07 CCl₄ | 225 | 3,250 | 850 | 3:1 |
| 4 | 5 | 675 | Cylrex FM | 0.04 toluene | 180 | 2,300 | 650 | 2.6:1 |
| 5 | 5 | 718 | do | 0.02 benzene | 180 | 2,400 | 740 | 2.3:1 |
| 6 | 5 | 710 | do | do | 170 | 2,500 | 700 | 2.6:1 |
| 7 | 5 | 695 | do | do | 170 | 2,550 | 700 | 2.6:1 |
| 8 | 5 | 673 | do | do | 175 | 2,250 | 660 | 2.3:1 |
| 9 | 5 | 655 | do | do | 180 | 2,050 | 625 | 2.1:1 |
| 10 | 5 | 680 | do | 0.05 benzene | 170 | 2,300 | 680 | 2.4:1 |
| 11 | 5 | 666 | do | do | 170 | 2,200 | 650 | 2.3:1 |
| 12 | 5 | 693 | do | 0.03 acetone | 175 | 2,350 | 700 | 2.3:1 |
| 13 | 5 | 678 | do | 0.02 xylene | 170 | 2,350 | 690 | 2.4:1 |
| 14 | 6 | 700 | do | 0.04 CCl₄ | 200 | 3,500 | 840 | 3.5:1 |
| 15 | 6 | 700 | do | 0.03 CCl₄ | 200 | 3,150 | 700 | 3.5:1 |
| 16 | 6 | 700 | do | 0.02 CCl₄ | 200 | 2,800 | 630 | 3.5:1 |
| 17 | 6 | 700 | Cylrex 200M | 0.02 CCl₄ | 200 | 3,640 | 840 | 4:1 |
| 18 | 6 | 700 | do | 0.015 CCl₄ | 200 | 2,800 | 630 | 3.5:1 |
| 19 | 6 | 700 | Vacuoline AA | 0.05 CCl₄ | 200 | 3,500 | 840 | 3.5:1 |
| 20 | 6 | 670 | Cylrex FM | 0.04 toluene | 170 | 2,150 | 720 | 2:1 |
| 21 | 6 | 665 | do | 0.04 benzene | 170 | 1,950 | 690 | 2:1 |
| 22 | 6 | 655 | do | do | 170 | 1,950 | 700 | 2:1 |
| 23 | 6 | 668 | do | 0.03 acetone | 175 | 2,050 | 660 | 2.1:1 |
| 24 | 6 | 683 | do | 0.02 xylene | 170 | 2,150 | 720 | 2:1 |
| 25 | 8 | 675 | Vacuoline AA | 0.01 CCl₄ | 175 | 2,200 | 590 | 3:1 |
| 26 | 8 | 700 | Cylrex FM | 0.04 CCl₄ | 200 | 4,000 | 900 | 3.5:1 |
| 27 | 8 | 650 | Cylrex 200M | 0.02 CCl₄ | 210 | 4,000 | 900 | 3.5:1 |
| 28 | 10 | 680 | Vacuoline AA | 0.02 CCl₄ | 175 | 3,100 | 720 | 3.5:1 |
| 29 | 10 | 720 | Cylrex FM | 0.05 CCl₄ | 220 | 4,200 | 950 | 4:1 |
| 30 | 10 | 700 | Cylrex 200M | 0.07 CCl₄ | 160 | 4,500 | 1,200 | 3.5:1 |
| 31 | 10 | 691 | Cylrex FM | 0.04 toluene | 180 | 2,500 | 740 | 2.6:1 |
| 32 | 10 | 645 | do | 0.02 benzene | 170 | 1,900 | 700 | 2:1 |
| 33 | 10 | 680 | do | 0.05 benzene | 170 | 2,800 | 850 | 2.6:1 |
| 34 | 10 | 685 | do | 0.03 acetone | 170 | 2,450 | 820 | 2.3:1 |
| 35 | 10 | 685 | do | 0.02 xylene | 180 | 2,250 | 800 | 2:1 |
| 36 | 12 | 670 | Cylrex 200M | 0.07 CCl₄ | 240 | 5,500 | 1,100 | 4:1 |
| 37 | 12 | 660 | Cylrex FM | 0.015 CCl₄ | 240 | 4,000 | 950 | 3.5:1 |
| 38 | 12 | 740 | Vacuoline AA | 0.07 CCl₄ | 150 | 4,500 | 1,200 | 3.5:1 |

The invention thus provides an advantageous method of toughening glass so that it has a modulus of rupture that may be as high as 5500 kg./cm.², and a ratio of surface compressive stress to central tensile stress that may be as high as 4:1, without impairing the optical characteristics of the glass. This toughened glass is particularly advantageous in applications where high strength is required, and the fact that the glass will break into small fragments if fractured is of little consequence. Thus, for example, the glass is particularly effective in the manufacture of panels for supersonic aircraft, and has other applications, for example in domestic building where such high strength is required.

We claim:

1. A method of toughening glass having a thickness of about 4.0 mm. to about 12.0 mm. comprising heating the glass to a temperature near its softening point, and then toughening the glass by quenching it in an oil bath, said oil bath containing a minor proportion of low boiling point liquid to produce rapid chilling of the glass immediately it is quenched and a major proportion of oil having a flash point greater than the boiling point of said low boiling point liquid whereby the glass gradually cools to the temperature of the oil bath immediately after said rapid chilling, said oil bath being held at a temperature below the flash point of the oil, said low boiling point liquid being maintained in the oil bath in selected proportion from 0.01% to 0.07% by weight and having a boiling point sufficiently lower than the flash point of the oil to produce said rapid chilling of the glass immediately it is quenched.

2. A method according to claim 1, wherein the oil/low boiling point liquid mixture is held at a temperature lying between the boiling point of the low boiling point liquid and the flash point of the oil, and said proportion of the low boiling point liquid is maintained by adding further low boiling point liquid to the oil/low boiling point liquid mixture.

3. A method according to claim 1, wherein the oil is selected from oils having a viscosity in the range 300 to 1000 centistokes at 38° C and a flash point in the range 220° C. to 310° C.

4. A method according to claim 1, wherein the low boiling point liquid is selected from carbon tetrachloride, toluene, benzene, acetone and xylene.

5. A method according to claim 1, wherein there is maintained in the oil/low boiling point liquid mixture a proportion from 0.01% to 0.05% of said low boiling point liquid.

6. A method according to claim 1, wherein the temperature of the oil/low boiling point liquid mixture is in the range 150° C. to 240° C., and said mixture induces in the glass a central tensile stress in the range 500 kg./cm.$^2$ to 1200 kg./cm.$^2$ and a ratio of surface compressive stress to central tensile stress in the range 2:1 to 4:1.

7. A method according to claim 6, wherein the glass is heated to a temperature in the range 650° C. to 740° C.

8. A method according to claim 7 of toughening a sheet of soda-lime-silica glass which is 6 mm. thick, wherein said proportion of low boiling point liquid is in the range 0.015% to 0.05% by weight.

9. A method according to claim 8, wherein said oil/low boiling point liquid mixture induces in the glass a central tensile stress in the range 630 kg./cm.$^2$ to 840 kg./cm.$^2$.

10. A method according to claim 1, wherein the temperature of the oil/low boiling point liquid mixture is in the range 150° C. to 200° C., and wherein said mixture induces in the glass a central tensile stress in the range 500 kg./cm.$^2$ to 840 kg./cm.$^2$ and a ratio of surface compressive stress to central tensile stress in the range 2:1 to 4:1.

11. A method according to claim 10, wherein the glass is heated to a temperature in the range 685° C. to 720° C.

12. A method according to claim 1, of toughening a sheet of soda-lime-silica glass which has a thickness in the range 4 mm. to 8 mm., wherein said oil/low boiling point liquid mixture induces in the glass a central tensile stress in the range 500 kg./cm.$^2$ to 900 kg./cm.$^2$ and a ratio of surface compressive stress to central tensile stress in the range 2:1 to 4:1.

References Cited

UNITED STATES PATENTS

| 3,186,816 | 6/1965 | Wartenberg | 65—116 |
| 3,271,207 | 9/1966 | Davis | 65—116 X |

FOREIGN PATENTS

| 316,108 | 11/1956 | Switzerland | 65—116 |

ARTHUR D. KELLOGG, Primary Examiner